(12) United States Patent
Hansen et al.

(10) Patent No.: US 7,841,122 B1
(45) Date of Patent: Nov. 30, 2010

(54) ADAPTABLE LEG SUPPORT FOR BIPOD ASSEMBLIES

(75) Inventors: Scott Hansen, Collierville, TN (US); Ronald Detillo, Southaven, MS (US)

(73) Assignee: Phoenix Tactical, LLC, Collierville, TN (US)

( * ) Notice: Subject to any disclaimer, the term of this patent is extended or adjusted under 35 U.S.C. 154(b) by 309 days.

(21) Appl. No.: 12/176,556

(22) Filed: Jul. 21, 2008

Related U.S. Application Data

(60) Provisional application No. 60/950,893, filed on Jul. 20, 2007.

(51) Int. Cl.
*F41A 23/02* (2006.01)
*F16B 21/07* (2006.01)
*F16M 11/20* (2006.01)

(52) U.S. Cl. .................. 42/94; 24/595.1; 403/354; 403/378; 411/552

(58) Field of Classification Search .............. 42/90, 42/94; 89/37.09; D22/108; 24/593.1, 594.1, 24/595.1, 628; 248/188, 188.2, 188.8; 403/354, 403/378; 411/522
See application file for complete search history.

(56) References Cited

U.S. PATENT DOCUMENTS

| 1,895,826 | A | * | 1/1933 | Trudeau | 267/263 |
| 2,489,283 | A | * | 11/1949 | Garand | 42/94 |
| 3,327,422 | A | * | 6/1967 | Harris | 42/94 |
| 3,407,454 | A | * | 10/1968 | Myatt | 411/549 |
| 4,398,322 | A | * | 8/1983 | Ewen | 24/595.1 |
| 5,003,328 | A | * | 3/1991 | Gaynor | 396/428 |
| D363,333 | S | * | 10/1995 | Giberson | D22/108 |
| 5,566,915 | A | * | 10/1996 | Hansare | 248/188.8 |
| 2005/0188596 | A1 | * | 9/2005 | Wygant | 42/94 |
| 2006/0248774 | A1 | * | 11/2006 | Pierce et al. | 42/94 |
| 2006/0278797 | A1 | * | 12/2006 | Keng et al. | 248/440.1 |
| 2007/0094912 | A1 | * | 5/2007 | Bender | 42/94 |
| 2009/0038200 | A1 | * | 2/2009 | Keng | 42/94 |

* cited by examiner

*Primary Examiner*—Bret Hayes
(74) *Attorney, Agent, or Firm*—Wyatt, Tarrant & Combs, LLP; H. Roy Berkenstock; Matthew A. Williams

(57) ABSTRACT

The present invention relates to adaptable leg supports for bipod assemblies and more specifically to an adaptable leg support assembly that is pivotable with respect to the legs of the bipod to maintain complete contact with the supporting surface as the weapon is rotated, removable to allow the adaptable leg support assembly to be sued with multiple bipod assemblies, and adaptable for use on different surfaces by changing the foot portion of the adaptable leg support assembly that actually contacts the supporting surface.

19 Claims, 4 Drawing Sheets

ADAPTABLE LEG SUPPORT FOR BIPOD ASSEMBLIES

CROSS-REFERENCE TO RELATED APPLICATIONS

This application claims the benefit of U.S. Provisional Application No. 60/950,893, filed Jul. 20, 2007, which is hereby incorporated herein by reference.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention generally relates to bipods and monopods for use with rifles and other weapons, and more specifically to the supports at the end of the bipod legs that are in contact with the surface providing support for the weapon.

2. General Background of the Invention

Bipod supports have long been used in connection with the rifles and other weapons, hereinafter referred to collectively as rifles. Such devices are generally clamped or bolted to the weapon's barrel or connected to a picatinny rail. The legs for such bipods can be either fixed in position to support the weapon or, as is more commonly the case, are spring-loaded and retractable to allow the legs to be extended to the desired length to support a rifle at the desired elevation and swiftly and securely retracted for movement from location to location. Such a spring-loaded leg typically comprises an internal spring that extends from the upper portion of the leg, near where the bipod assembly attaches to the weapon, to the lower portion of the leg, at a point close to the end of the leg that is in contact with the surface supporting the weapon.

The internal spring is typically connected to the lower portion of the leg using a pin that has a diameter of one-eighth of an inch that extends through the leg and protrudes on both sides of the leg. To prevent this pin from snagging on the user's clothing or other objects, bipod manufacturers typically place this pin close enough to the end of the leg that the rubber boot on the end of the leg extends far enough up the leg to cover the ends of the pin, which also has the effect of holding the rubber boot in place. This rubber boot also typically provides the sole point of contact between the leg and the supporting surface.

This, however, creates numerous problems that result in decreased accuracy from the weapon when using such typical rubber boots. If the boots are rounded, a similar amount of contact is provided throughout the normal range that the weapon may be pivoted, but the contact surface is generally less than sufficient to effectively "load up" the weapon on a hard surface, resulting in the weapon hopping after a shot. (Loading up involves the shooter leaning forward with his shoulder against the weapon's stock to increase the pressure on the bipod to keep the weapon in place.) This results in the shooter having to reset after each shot. Such rounded over rubber boots also pose a problem on soft ground because the act of loading up the weapon will tend to drive the ends of the legs into the ground.

Other known designs use disk- or claw-shaped feet, ostensibly to provide greater contact with the ground. Since these known designs do not have the capability to pivot, the advantage of having an ostensibly larger contact area is lost unless the weapon is being used on perfectly flat ground at an elevation parallel to the ground. Thus, if the shooter has to tilt the weapon relative to the ground, a portion of the feet are lifted off of the ground, thereby reducing the amount of contact the feet have with the supporting surface.

Yet another problem with known bipod designs is that the feet are not removable. This results in users needing to carry multiple bipods for different surfaces to ensure that they have a bipod that will provide them with the accuracy they need under different circumstances—a luxury that many shooters, especially those in military and police swift response units, simply do not have. Alternatively, a user could carry a single bipod with generic feet, such as the rounded rubber boots described above, that allows the bipod to be use in a variety of conditions but at a less than optimal level of accuracy.

SUMMARY OF THE INVENTION

The present invention relates to adaptable leg supports for bipod for rifles that pivot to allow the leg support to maintain optimum contact with the surface, even on uneven ground, allowing the user to "load up" the weapon in a variety of circumstances. The adaptable leg supports are additionally interchangeable, allowing the user to carry a variety of adaptable leg supports to adapt a single bipod to a variety of conditions.

BRIEF DESCRIPTION OF THE DRAWINGS

For a further understanding of the nature, objects, and advantages of the present invention, reference should be had to the following detailed description, read in conjunction with the following figures, wherein like reference numerals denote like elements and wherein.

DETAILED DESCRIPTION OF THE INVENTION

Figure 1:
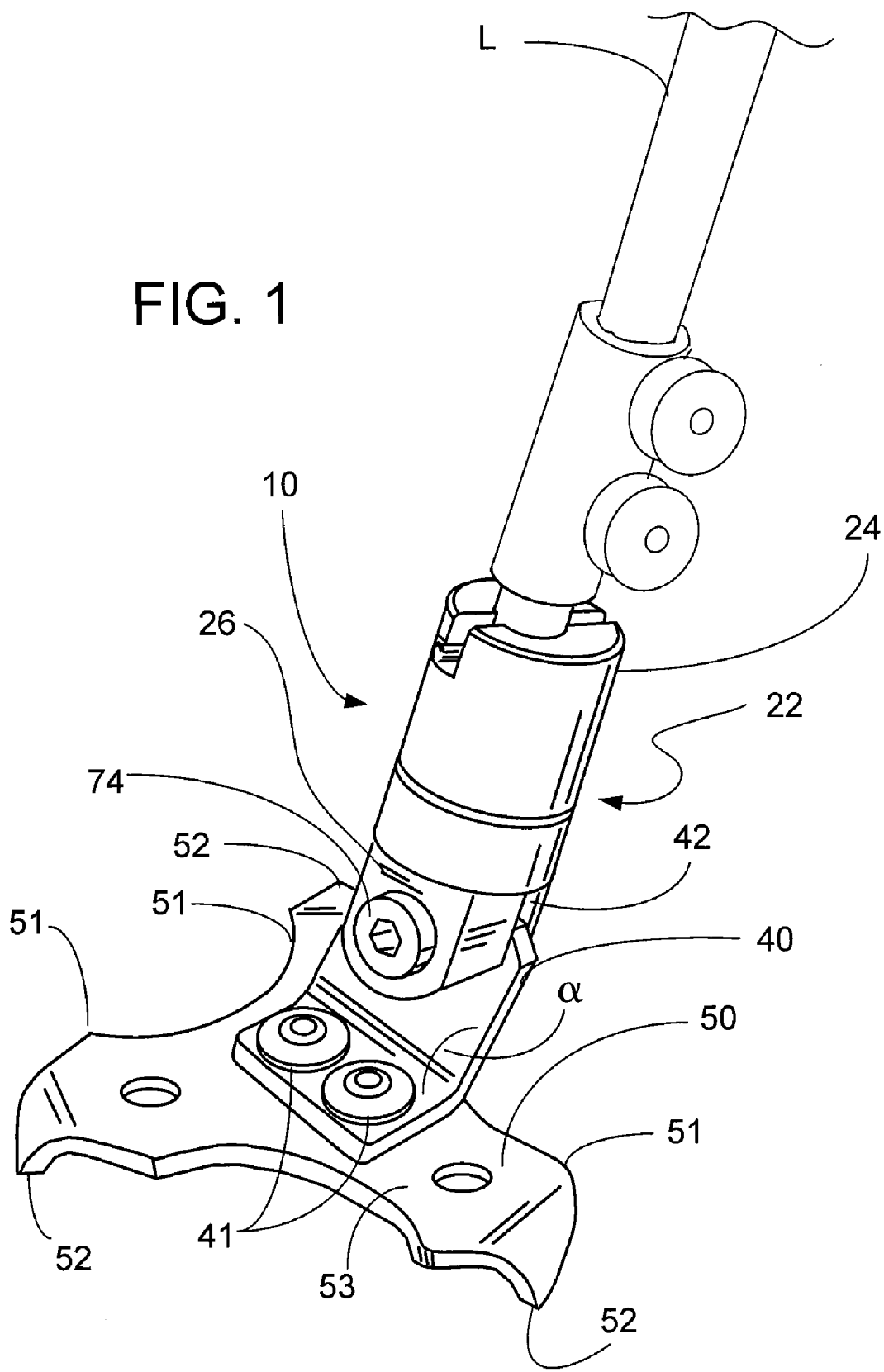
FIG. 1—Illustration of an embodiment of the invention wherein the adaptable leg support is attached to the leg of a bipod.

FIG. 1 shows a first embodiment of adaptable leg support assembly 10. Adaptable leg support assembly 10 is comprised of adapter 22 and claw foot 50. Adapter 22 comprises leg-receiving portion 24 and foot-receiving portion 26. Adapter 22 is preferably machined from T6 aluminum although it can be formed from any substantially rigid material capable of having the requisite features machined into it or capable of being formed into the requisite shape by molding, die-casting, or other methods of forming.

Figure 2:
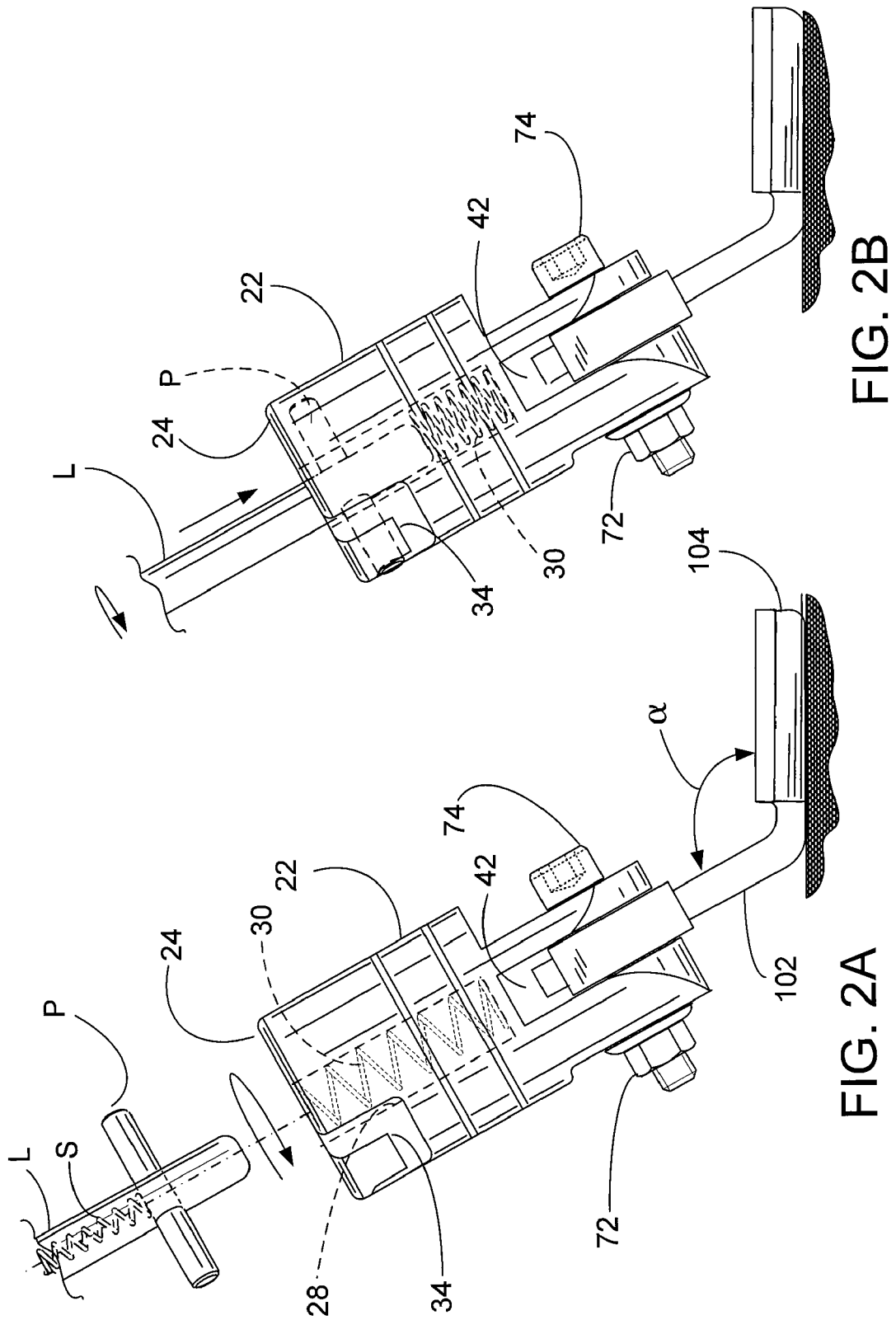
FIG. 2A—Illustration of an embodiment of the invention wherein the adaptable leg support is detached from the leg of a bipod.
FIG. 2B—Illustration of the embodiment shown in FIG. 2B wherein the adaptable leg support is attached to the leg of a bipod.
Figure 3:
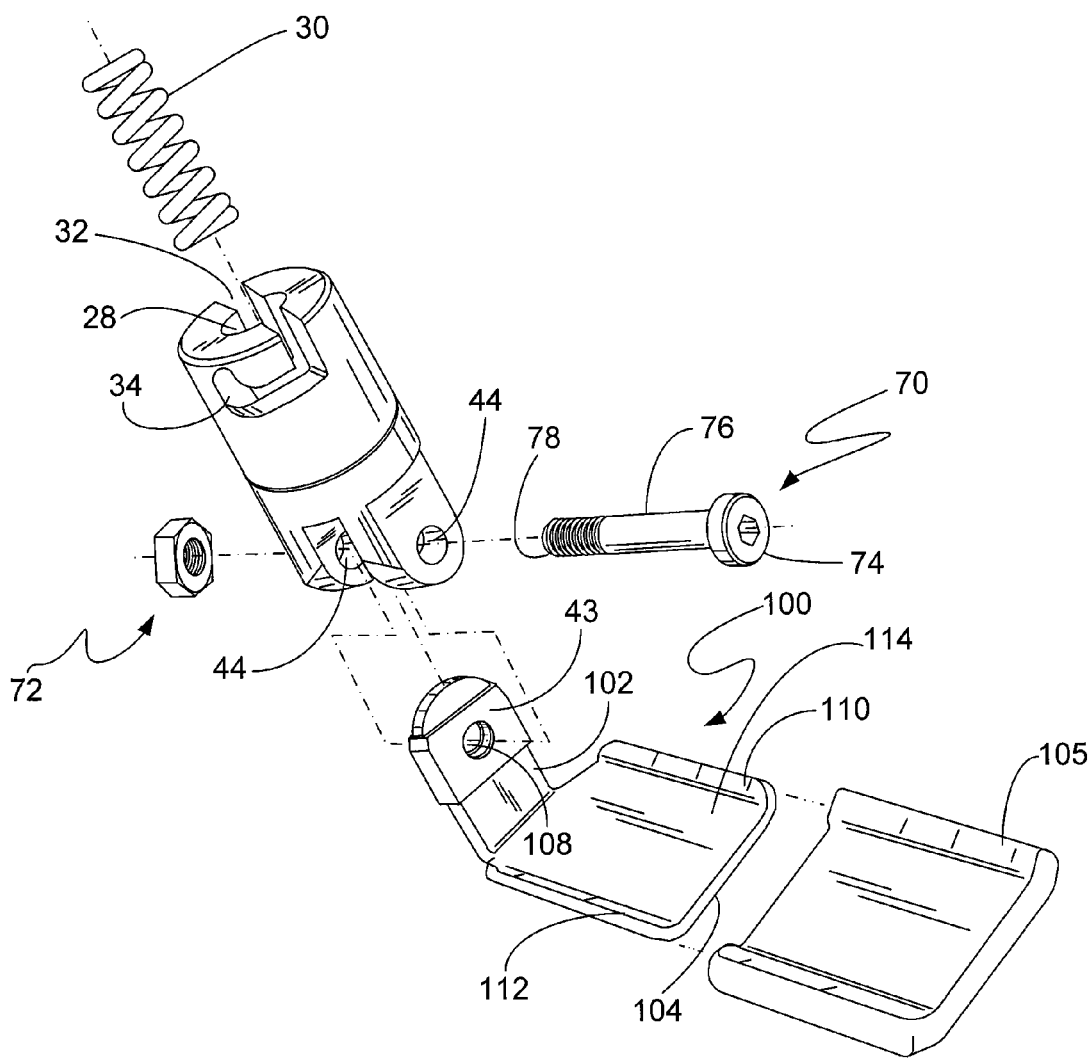
FIG. 3—Exploded view of an embodiment of the invention.

Referring to FIG. 3, leg-receiving portion 24 of adapter 22 defines blind bore 28 and keyways 32 and 34. Spring 30 is retained in blind bore 28 using an epoxy adhesive to adhere spring 30 to the bottom of blind bore 28. Blind bore 28 has a diameter greater, preferably no more than one-sixteenth of an inch greater, than the diameter of leg L. Spring 30 preferably has a diameter equal to the diameter of leg L such that it exerts force against the bottom of leg L when leg L is inserted into blind bore 28. Keyways 32 and 34 are J-shaped channels defined in the sidewall of blind bore 28 of the leg-receiving portion 24 of adapter 22. Keyways 32 and 34 have a width just greater than the diameter of pin P (shown in FIGS. 2 & 4), thereby allowing pin P to traverse keyways 32 and 34. The opening in keyways 32 and 34 are diametrically opposed to allow opposing end portions of pin P on leg L to simultaneously traverse keyways 32 and 34.

Referring to FIG. 2A, the lower portion of a typical bipod leg L (with the standard rubber boot removed) is illustrated. Leg L typically contains internal spring S that extends from pin P located at the lower end of each leg L to hinge bolts (not shown) at the upper end of each leg L. Leg L typically has a diameter of three-eighths of an inch and the pin P typically has a length of seven-eighths of an inch and a diameter of one-eighth of an inch. Of course these measurements can vary depending on the application for which the bipod is designed. The ends of pin P that extend beyond the outer surface of leg L provide the point of removable attachment for adapter 22.

Referring to FIGS. 2A and 2B, adapter 22 is connected to leg L by aligning the opening in keyway 32 and the opening in keyway 34 with the opposing end portions of pin P on leg L. Leg L is then inserted into blind bore 28 with sufficient force to compress spring 30 until the opposing end portions of pin P reach the bottom portion of the J-shape of keyways 32 and 34. Adaptable leg support assembly 10 is then rotated until the opposing end portions of pin P reach the closed end portion of J-shaped keyways 32 and 34. The force is then removed from leg L and the opposing force of spring 30 causes leg L to move slightly out of blind bore 28 until the end portions of pin P engage the closed end portion of keyways 32 and 34.

Referring again to FIG. 1, claw foot 50 is attached to slotted portion 26 of adapter 22 via bracket 40. Bracket 40 has an angle α that is equal to the angle that leg L makes with the barrel of the rifle. Bracket 40 is connected to claw foot 50 using a pair of three-sixteenth inch diameter rivets 41. In alternative embodiments, a single rivet 41 or plurality of rivets 41 greater than two can be used to connect bracket 40 to claw foot 50 or one or more bolts and nuts (not shown) can be used. Bracket 40 is sized to slide into slot 42 defined by slotted portion 26 of adapter 22. In one embodiment, the end portion of slot portion 26 of adapter 22 defines a pair of aligned apertures 44 located to align with aperture 46 in bracket 40 when bracket 40 is inserted into slot 42. Bracket 40 is then pivotally connected to adapter 22 using threaded pivot pin 70 and nut 72 (best seen in FIG. 3). The pivotal connection allows claw foot 50 to remain fully in contact with in contact with the supporting surface as the rifle is rotated through a range of angles to the supporting surface as the shooter aims the rifle. Thus, the shooter is allowed to load up the rifle more effectively because the complete contact of the feet with the ground allows the shooter to apply greater pressure to the rifle's shoulder rest without causing the feet slide.

In certain embodiments, washers (not shown) may be inserted between the internal walls of slot 42 and the adjacent surfaces of bracket 40 or rub sleeve 43 (best seen in FIG. 3) surrounding a portion of bracket 40 adjacent to aperture 46 can be used to facilitate the rotation of bracket 40 relative to adapter 22. (In FIG. 3, the rub sleeve is shown surrounding the portion of interconnection tab 102 of ski foot 100 that corresponds to the portion of bracket 40 that defines aperture 46 when claw foot 50 is connected to adapter 22.) In certain embodiments the washers or rub sleeve 43 are formed from plastic, and in a certain embodiment rub sleeve 43 is formed from a polyacetal such as Delrin®.

Each claw 51 of claw foot 50 extends radially away from the center of claw foot 50 and is approximately equally spaced from adjacent claws 51. Each claw 51 terminates in a point 52 that is turned down from upper surface 53 of claw foot 50.

Figure 4:
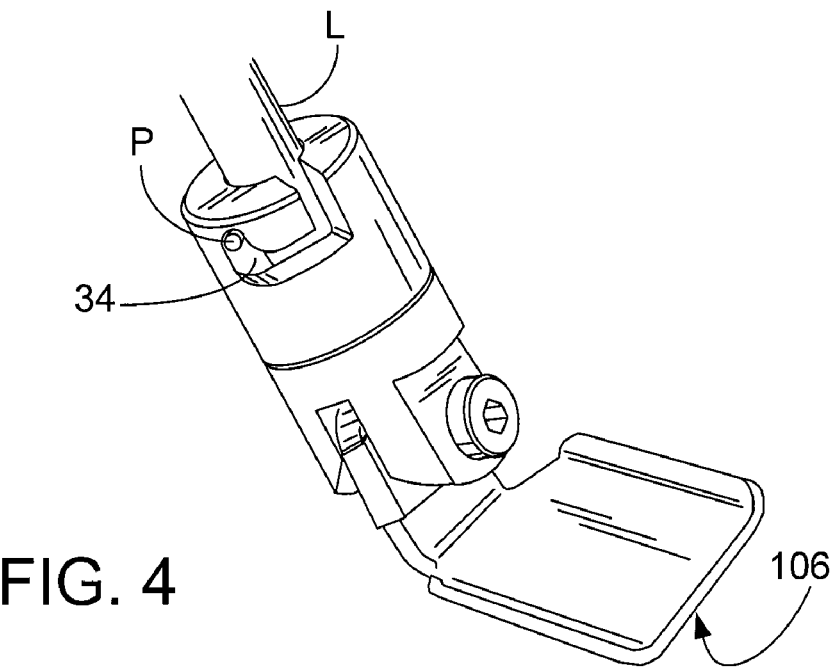
FIG. 4—Illustration of the embodiment shown in FIG. 2A wherein the adaptable leg support is attached to the leg of a bipod.

The embodiment illustrated in FIGS. 2-4 includes ski foot 100. Ski foot 100 is preferably formed from a single piece of metal or other relatively rigid material and comprises two portions: interconnection tab 102 and supporting portion 104. Interconnection tab 102 forms an angle α with supporting portion 104 that is equal to the angle that leg L makes with the barrel of the rifle such that bottom surface 106 of supporting portion 104 is parallel to the barrel of the weapon when the bipods legs are deployed. Ski foot 100 has a thickness that is complementary to slot 42 defined by slotted portion 26 of adapter 22, and interconnection tab 102 defines aperture 108 that allows ski foot 100 to be pivotally connected to adapter 22 in the same manner as bracket 40 of claw foot 50. The pivotal connection allows supporting portion 104 of ski foot 100 to remain fully in contact with in contact with the supporting surface as the rifle is rotated through a range of angles to the supporting surface as the shooter aims the rifle. Thus, the shooter is allowed to load up the rifle more effectively because the complete contact of the feet with the ground allows the shooter to apply greater pressure to the rifle's shoulder rest without causing the feet slide.

As best seen in FIG. 3, threaded pivot pin comprises head end portion 74, having a diameter greater than the diameter of aligned apertures 44 in adapter 22; opposing threaded end portion 78; and cylindrical portion 76, having a smooth surface and a diameter slightly smaller than the diameter of aligned apertures 44 in adapter 22 and aperture 108 in interconnection tab 102 located intermediate head end portion 74 and opposing threaded end portion 78. In the illustrated embodiment, rub sleeve 43 surrounds a portion of interconnection tab 102 adjacent to aperture 108 to facilitate the rotation of ski foot 100 relative to adapter 22.

Supporting portion 104 of ski foot 100 further includes upstanding edges 110 and 112. In the illustrated embodiment, edges 110 and 112 extend away from upper surface 114 of supporting portion 104 at an angle of approximately 135 degrees, but any angle between 90 and 180 degrees would work. These upstanding edges allow the wide, flat bottom surface 106 to slide easily of the top of the shooting surface rather than digging in. This characteristic is frequently desirable with automatic weapons to allow the user to quickly redirect fire without having to lift the weapon.

Ski foot 100 can be adapted for use in applications in which the user does not want the weapon to slide on the shooting surface by covering bottom surface 106 with non-slip boot 108. Boot 108, which can be any stretchable, non-slip material such as natural or synthetic rubber, is connected to ski foot 100 by inserting supporting portion 104 into boot 105. This allows the user to load up the weapon when using it on a shooting bench or an urban surface such as a rooftop, a sidewalk, or a vehicle.

Figure 5:
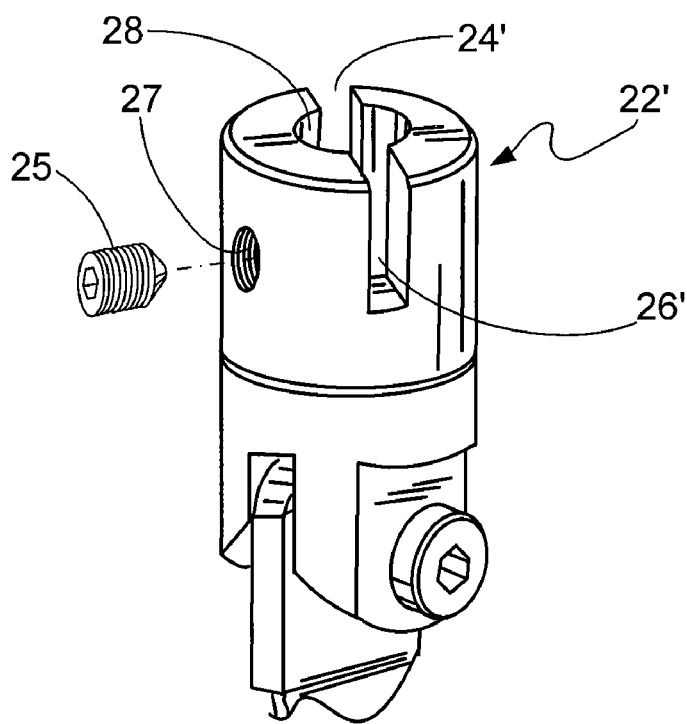
FIG. 5—Illustration of an embodiment of the adapter portion of the adaptable leg support.

Illustrated in FIG. 5 is an alternative embodiment of adapter 22' that can accommodate bipods that have pins in the end portions of their legs as discussed above and bipods that do not have pins in the end portions of their legs. In this embodiment, keyways 24' and 26' have a straight shape rather than a J-shape and there is no spring contained in bore 28. Also defined in adapter 22' are one or more threaded apertures 27 for receiving set screws 25. The leg of the bipod is inserted into bore 28 and the adapter is connected to the leg by tightening set screws 25 against the leg of the bipod. If the leg of the bipod has a pin located at its lower portion, the end portions of the pin can slide into keyways 24' and 26'.

While the above describes several specific embodiments of the invention, those skilled in the art may appreciate that certain modifications may be made to the apparatus and methodology herein disclosed, without departing from the scope and spirit of the invention. Thus, it should be understood that the invention may be adapted to numerous rearrangements, modifications, and alterations and that all such are intended to be within the scope of the appended claims.

We claim:

1. A bipod assembly for use with a rifle having a pair of spring-loaded legs, each leg having a mounting portion adjacent said rifle and an end portion opposing said mounting portion, comprising:
    a pin located toward the end portion of each said leg and
    an adaptable leg support assembly connected to the end of each said leg, said adaptable leg support assembly including
        an adapter having a cylindrical portion and an opposing slotted portion, said cylindrical portion defining a cylindrical blind bore, a pair of opposing J-shaped keyways for receiving the end portions of said pin, and a spring contained in said blind bore and conjoined to the bottom wall of said blind bore and said slotted portion defining a pair of aligned apertures; and
        a foot, said foot being pivotally connected to the slotted portion of the adapter.

2. A bipod assembly as in claim 1, wherein the adjustable leg support assembly is removably connected to the end of the leg and the foot is removably connected to the slotted portion of the adapter.

3. An adaptable leg support for a bipod assembly comprising:
    an adapter having a leg-receiving portion and a foot-receiving portion wherein
        the leg-receiving portion and the foot-receiving portion each have opposing first and second ends and wherein the first end of the leg-receiving portion and the first end of the foot-receiving portion are interconnected at an intermediate point of the adapter;
        the leg-receiving portion defines
            a centrally located, longitudinal blind bore extending from the second end of the leg-receiving portion to an intermediate point in the adapter where a bottom surface of said blind bore is defined by a bottom wall wherein said blind bore is sized to receive a leg portion of the bipod assembly and
            a pair of opposing keyways wherein each of said pair of opposing keyways extends from a first end of the adapter to an intermediate point in the leg-receiving portion and
        the foot-receiving portion defines
            a slot, said slot extending from the second end of the foot-receiving portion toward the first end of the foot-receiving portion and terminating at an intermediate point in the foot-receiving portion wherein said slot is flanked by a pair of opposing sidewalls and
            a pair of opposing apertures transverse to said slot.

4. The adaptable leg support of claim 3 wherein:
    the leg-receiving portion is cylindrical;
    the blind bore is concentric with the circumference of the leg-receiving portion; and
    the pair of opposing keyways defined by the leg-receiving portion are diametrically opposed.

5. The adaptable leg support of claim 4, wherein the keyways defined by the leg-receiving portion of the adapter are J-shaped.

6. The adaptable leg support of claim 5 further comprising a spring, said spring being contained within the blind bore defined by the leg-receiving portion of the adaptor.

7. The adaptable leg support of claim 6 wherein the spring is conjoined to the bottom wall of the blind bore.

8. The adaptable leg support of claim 3 further comprising a foot, said foot being pivotally connected to the foot-receiving portion of the adapter.

9. The adaptable leg support of claim 8 wherein the foot is removably connected to the foot-receiving portion of the adapter.

10. The adaptable leg support of claim 9 wherein the foot further comprises:
    a bracket, said bracket having
        a first end portion sized to be received into the slot defined by the foot-receiving portion of the adapter and
        an opposing second end portion and
    a base plate;
    wherein the base plate is interconnected to the second end portion of the bracket whereby an upper surface of the base plate is adjacent to the second end portion of the bracket.

11. The adaptable leg support of claim 10 wherein the base plate has a claw shape, said claw shape being formed by a plurality of equally spaced claws extending outward from a central portion of the base plate wherein each claw of said plurality of claws terminates in a point, said point on each claw being turned such that it extends away from the bracket.

12. The adaptable leg support of claim 10 wherein:
    the first end portion of the bracket defines an aperture therethrough whereby said aperture can be aligned with the pair of opposing apertures defined by the foot-receiving portion of the adapter and
    the bracket is connected to the adapter using a threaded pivot pin that extends through the aligned apertures in the adapter and the bracket.

13. The adaptable leg support of claim 12 further comprising a rub sleeve, said rub sleeve being interposed between the first end portion of the bracket and the pair of opposing sidewalls flanking the slot defined by the foot-receiving portion of the adapter.

14. The adaptable leg support of claim 8 wherein:
    the foot includes
        an interconnection tab, said interconnection tab defining an aperture therethrough whereby said aperture can be aligned with the pair of opposing apertures defined by the foot-receiving portion of the adapter and
        a supporting portion, said supporting portion having a bottom supporting surface and opposing end portions that are turned up such that the opposing end portions extend away from the supporting surface; and
    the foot is connected to the adapter using a threaded pivot pin that extends through the aligned apertures defined in the adapter and the interconnection tab.

15. The adaptable leg support of claim 14 further comprising a rub sleeve, said rub sleeve being interposed between the interconnection tab and the pair of opposing sidewalls flanking the slot defined in the foot-receiving portion of the adapter.

16. The adaptable leg support of claim 15 wherein the supporting portion of the foot is encased by a removable, non-slip boot.

17. The adaptable leg support of claim 3 wherein one or more threaded apertures are defined by the leg-receiving portion of the adapter such that said one or more apertures extend radially from the blind bore through the side of the leg-receiving portion of the adapter.

18. The adaptable leg support of claim 17 further comprising one or more set screws, each of said one or more set screws being sized to be received by said one or more threaded apertures whereby said set screw can be threaded into said aperture and tightened against the leg portion of the bipod assembly to secure the adapter to the leg.

19. A method of attaching an adapter portion of an adaptable leg support to a leg of a bipod assembly comprising:

removing a rubber boot located at an end portion of the leg of the bipod assembly to expose a retention pin, the retention pin having a pair of opposing end portions that extend outward from diametrically opposed points on the leg;

aligning the end portions of the retention pin with a pair of J-shaped keyways defined by the adapter portion of the adaptable leg support;

applying force to the adapter portion and the leg causing the end portion of the leg to be inserted into a blind bore defined in the adapter portion and compressing a spring that is retained in said blind bore;

rotating the adapter portion causing the end portions of the retention pin to traverse the flat portions of the J-shaped keyways;

releasing the force applied to the adapter and the leg causing the adapter to be retained in place on the end portion of the leg by the retention pin being in contact with the closed end of the J-shaped keyway and the force of the compressed spring against the leg portion of the bipod assembly.

* * * * *